United States Patent
Jakupi

(10) Patent No.: US 10,782,958 B2
(45) Date of Patent: Sep. 22, 2020

(54) PERFORMANCE SOFTWARE UPDATES ON DF/CAFI BREAKERS WITH EXISTING HARDWARE ARCHITECTURE

(71) Applicant: SCHNEIDER ELECTRIC USA, INC., Andover, MA (US)

(72) Inventor: Andi Jakupi, Marion, IA (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 15/972,946

(22) Filed: May 7, 2018

(65) Prior Publication Data
US 2019/0339961 A1 Nov. 7, 2019

(51) Int. Cl.
| | |
|---|---|
| G06F 8/65 | (2018.01) |
| G06F 9/445 | (2018.01) |
| H02H 1/00 | (2006.01) |
| H02H 3/16 | (2006.01) |
| H04B 3/54 | (2006.01) |
| H04L 29/08 | (2006.01) |
| G06F 11/36 | (2006.01) |

(52) U.S. Cl.
CPC ............... *G06F 8/65* (2013.01); *G06F 9/445* (2013.01); *H02H 1/0061* (2013.01); *H02H 1/0092* (2013.01); *H02H 3/167* (2013.01); *H04B 3/542* (2013.01); *H04L 67/34* (2013.01); *G06F 11/36* (2013.01)

(58) Field of Classification Search
CPC . G06F 8/65; G06F 9/445; G06F 11/36; H02H 1/0061; H02H 1/0092; H02H 3/167; H04B 3/542; H04L 67/34

USPC .......................................................... 717/168
See application file for complete search history.

(56) References Cited

U.S. PATENT DOCUMENTS

| | | | |
|---|---|---|---|
| 6,259,996 B1 | 7/2001 | Haun et al. | |
| 6,421,214 B1 | 7/2002 | Packard et al. | |
| 6,625,550 B1 | 9/2003 | Scott et al. | |
| 7,136,265 B2 | 11/2006 | Wong et al. | |
| 7,193,827 B2 | 3/2007 | Reid et al. | |
| 7,253,637 B2 | 8/2007 | Dvorak et al. | |
| 7,633,727 B2 | 12/2009 | Zhou et al. | |
| 8,243,411 B2 | 8/2012 | Larson | |
| 9,869,709 B2 | 1/2018 | Belhaja et al. | |
| 2008/0112474 A1* | 5/2008 | Refaeli ................. | H04B 3/542 375/222 |
| 2016/0149389 A1* | 5/2016 | Schroeder ............ | H02H 1/0092 361/93.2 |

(Continued)

*Primary Examiner* — Wei Y Zhen
*Assistant Examiner* — Mohammed N Huda
(74) *Attorney, Agent, or Firm* — Locke Lord LLP

(57) ABSTRACT

Example embodiments of the invention perform updating of arc-fault detection protection software in a dual function/combination arc-fault circuit interrupter (DF/CAFI) device, without requiring any hardware changes to the device. Maintenance software running in a processor in the device synchronizes downloading the updated protection software as packets of modulated data from a host device, downloaded over an electric power line connected to the device. The modulated data on the power line is sensed by a current sensor of the device and is filtered, demodulated, and sampled by the device. The maintenance software then assembles packets of the demodulated and sampled data and loads them into memory in the device as the updated arc-fault detection protection software.

13 Claims, 15 Drawing Sheets

(56) References Cited

U.S. PATENT DOCUMENTS

2016/0225562 A1* 8/2016 Frank et al. ......... H02H 1/0092

* cited by examiner

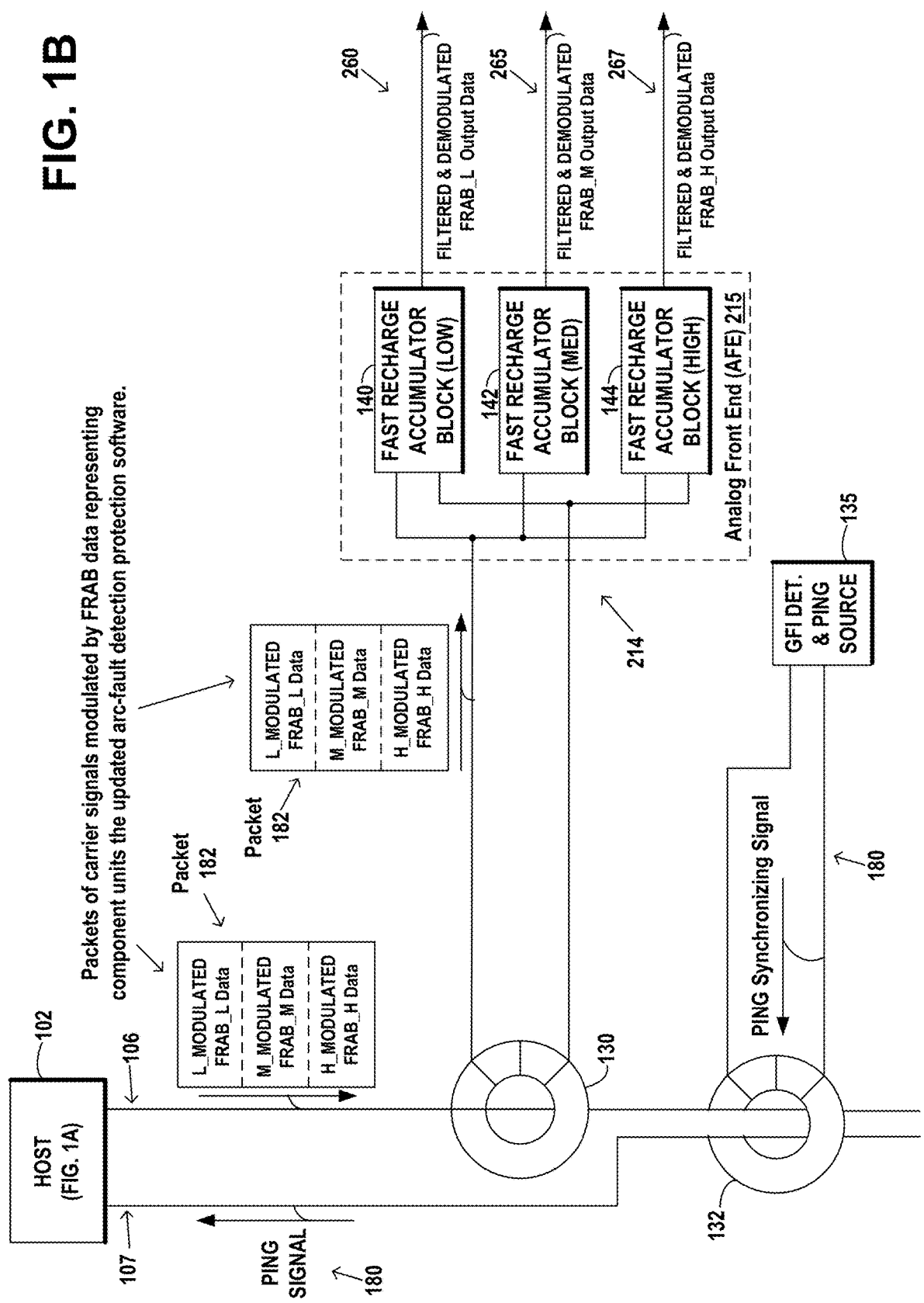

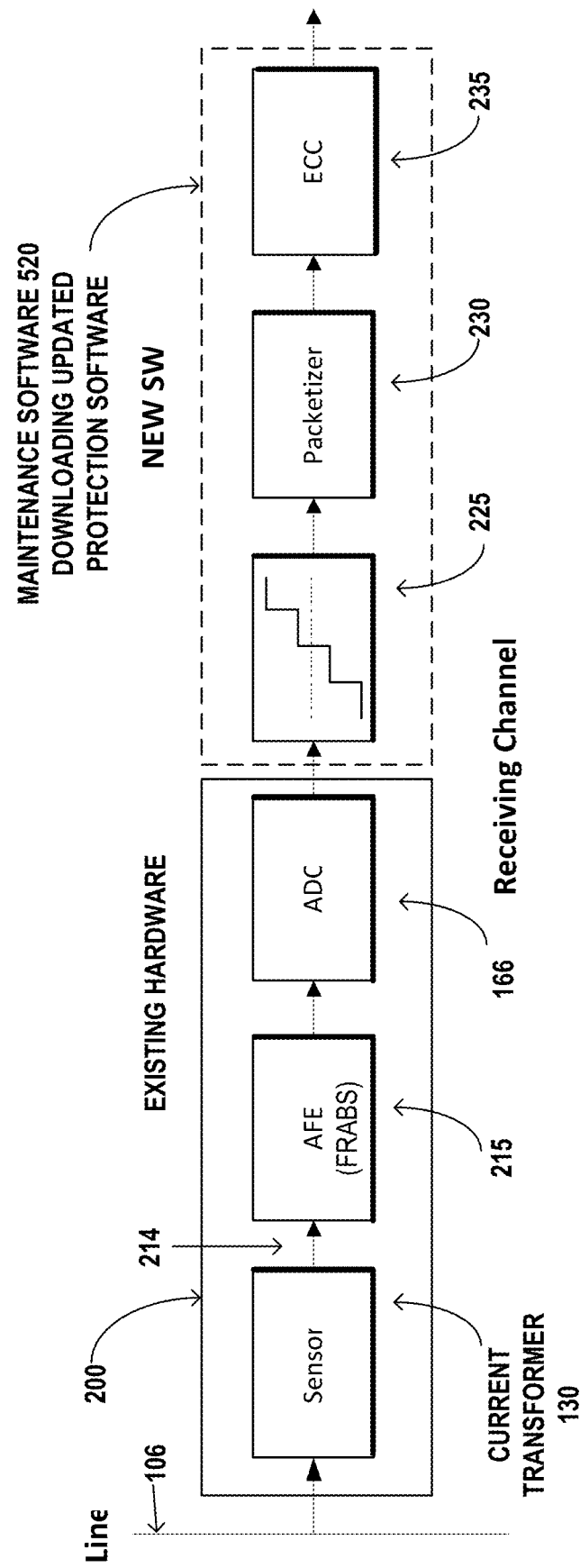

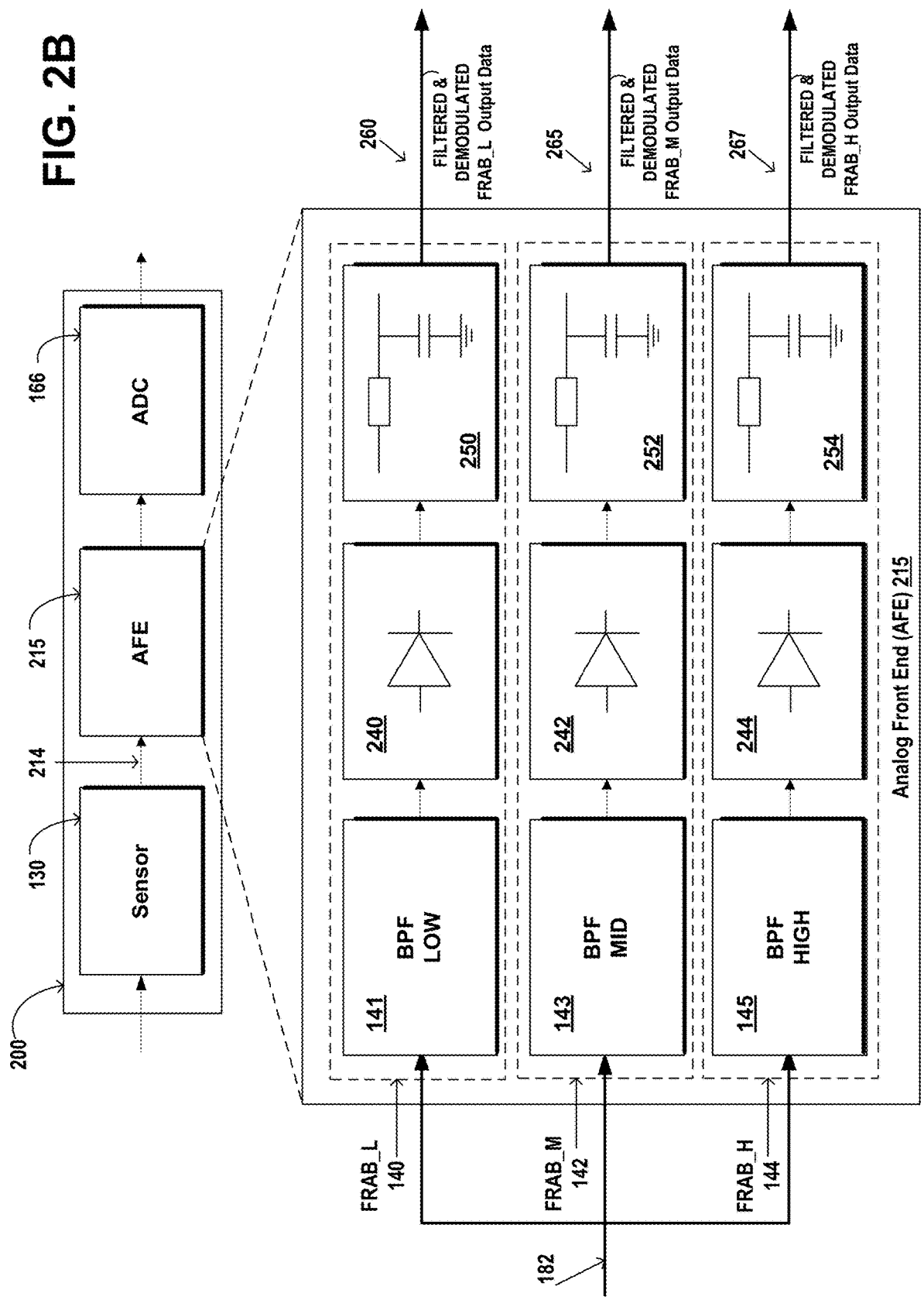

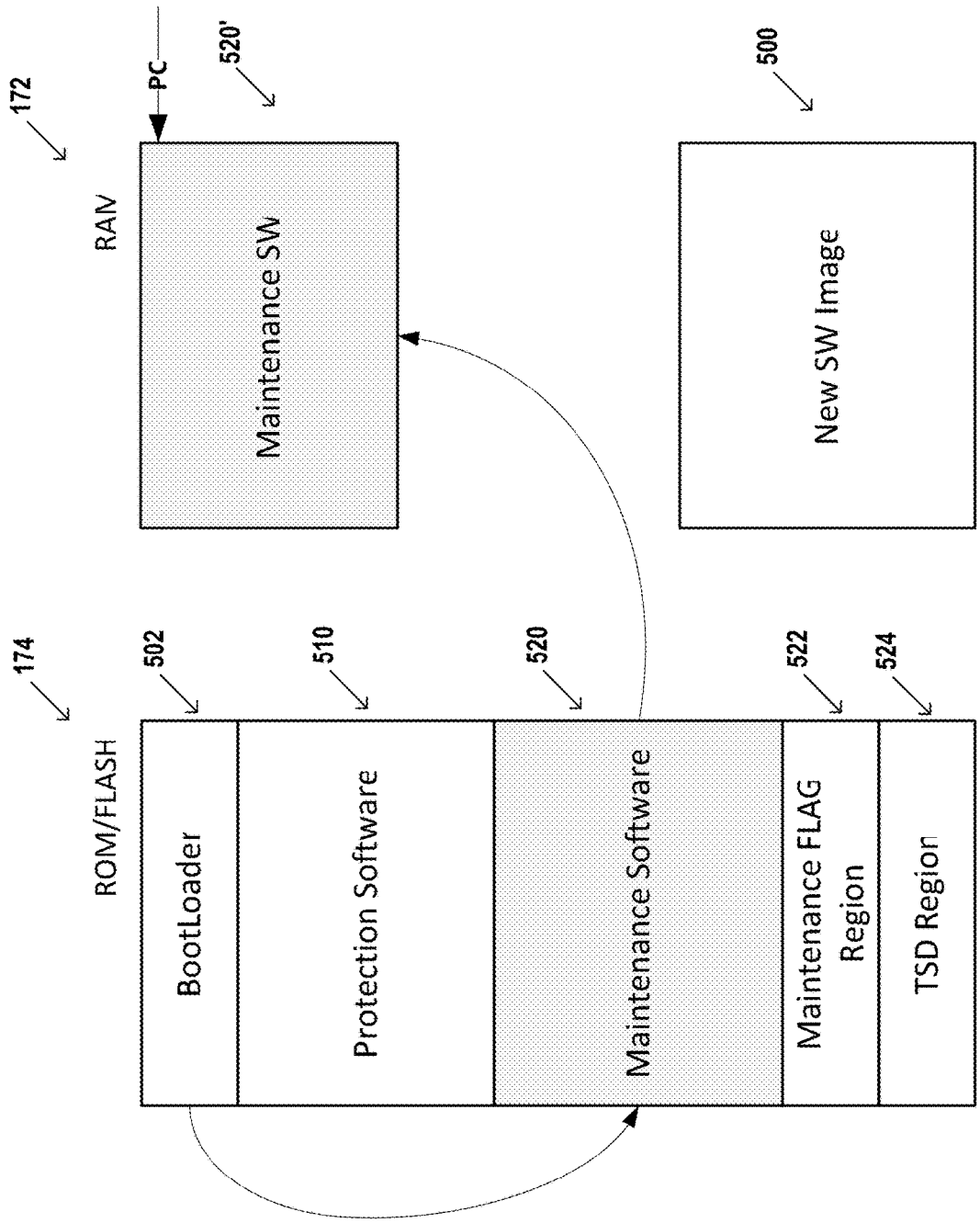

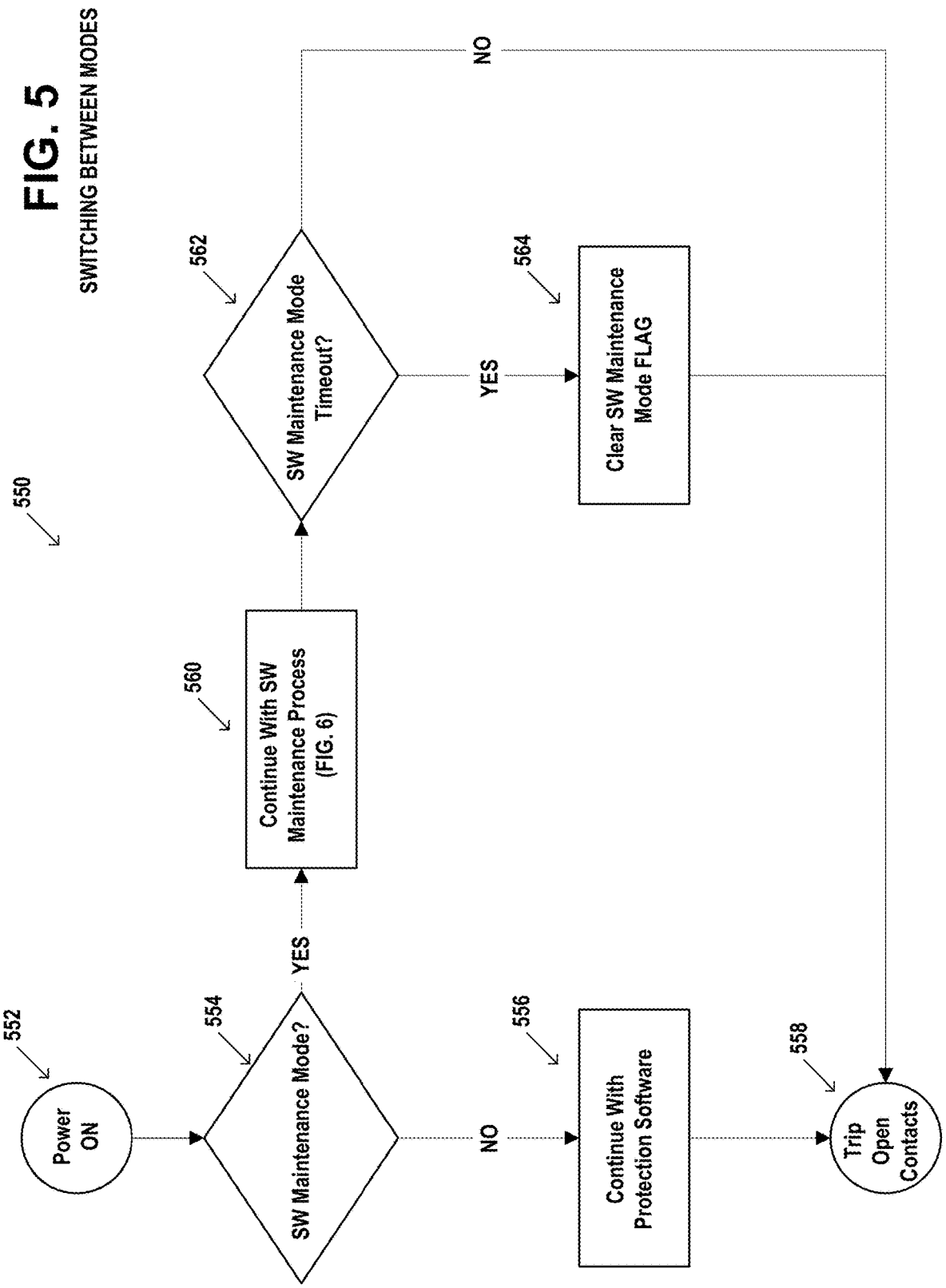

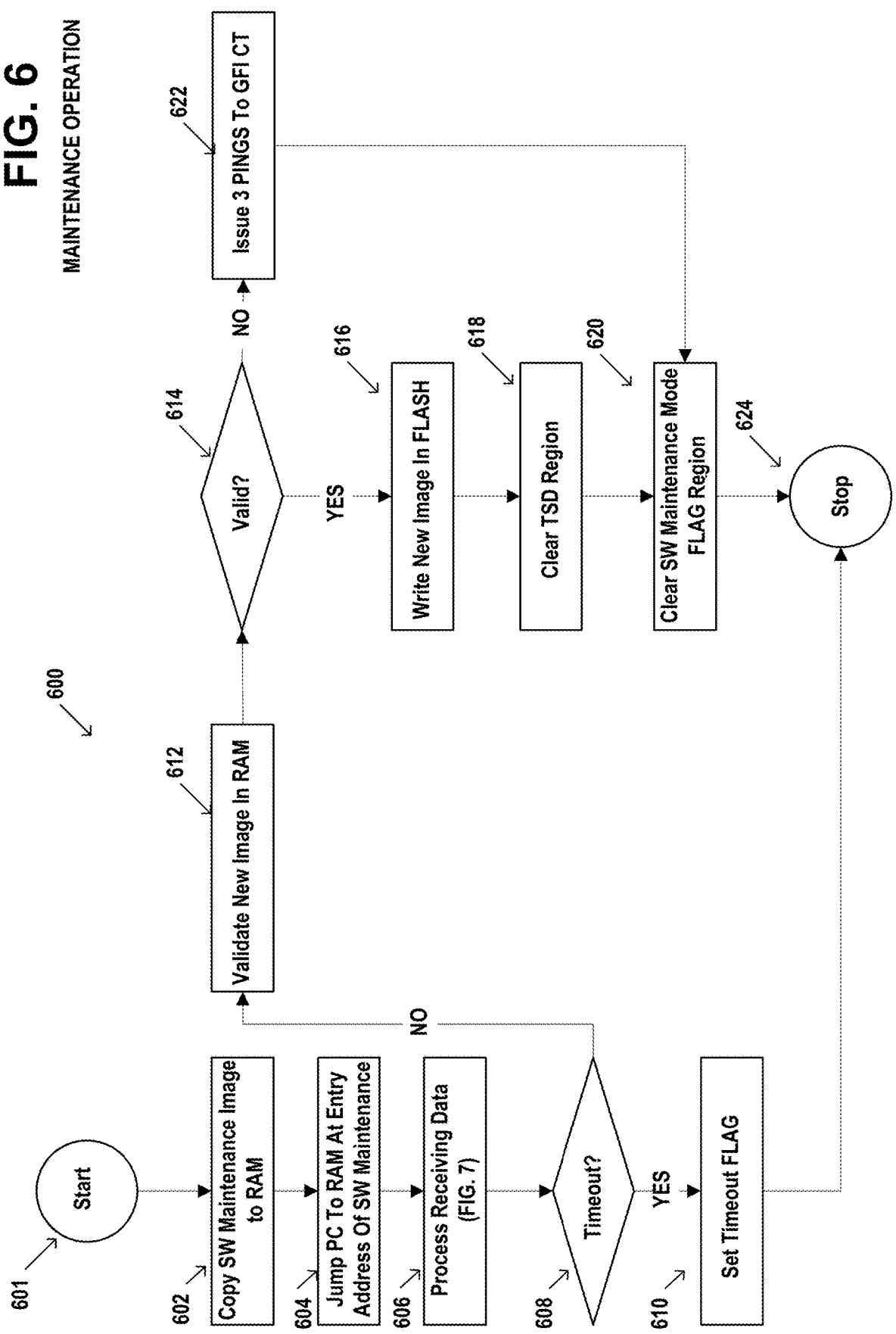

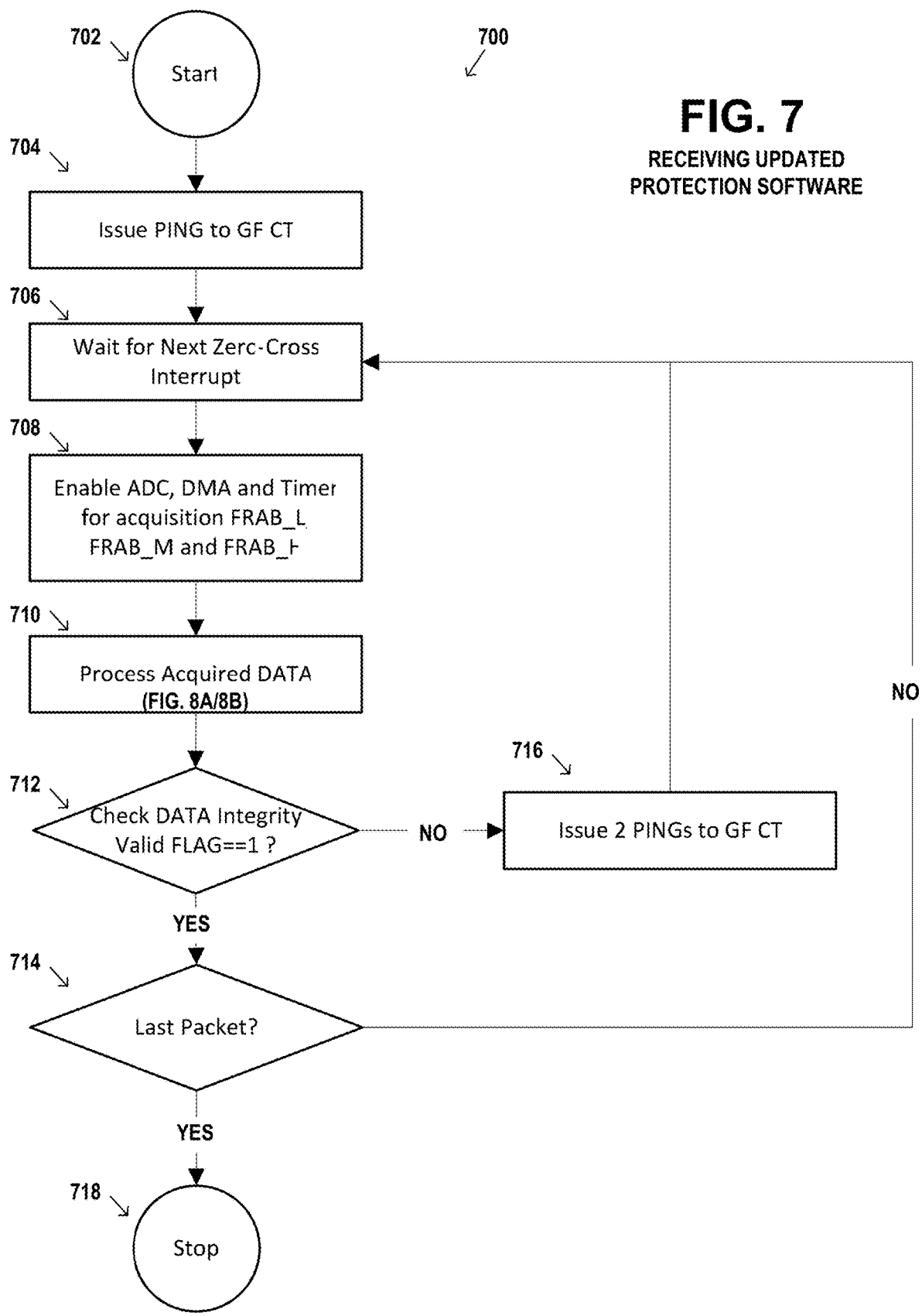

PULSE AMPLITUDE MODULATION DECODING

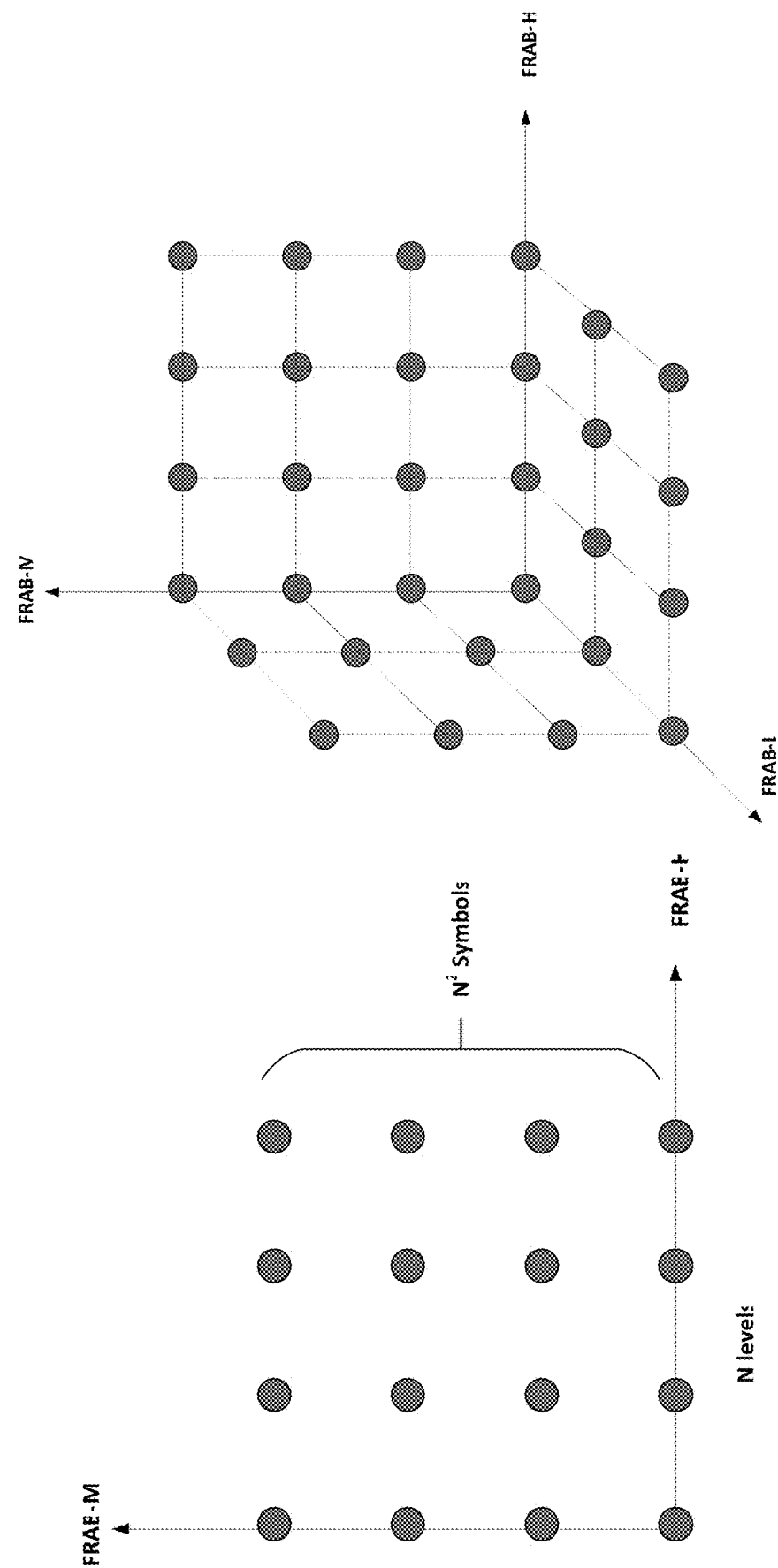

PERFORMANCE SOFTWARE UPDATES ON DF/CAFI BREAKERS WITH EXISTING HARDWARE ARCHITECTURE

BACKGROUND OF THE INVENTION

1. Field of the Invention

The present disclosure relates generally to fault detection in electrical circuits and more particularly to installing updated arc-fault detection protection software in electronic circuit breakers/interrupters, such as a dual function (DF) combination arc-fault circuit interrupter (CAFI) and ground-fault interrupter (GFI) device, without requiring any hardware changes.

2. Description of Related Art

A combination arc-fault circuit interrupter (CAFI) device provides protection against parallel arcing in a circuit, which occurs when electricity jumps the gap between wires of different voltages. In addition, the CAFI device provides protection against series arcing in the circuit, which occurs when electricity jumps the gap between the strands within the same wire. A dual function (DF) CAFI device adds a ground-fault interrupter (GFI) function, which provides protection against electrical shock from ground-faults, which occur when electrical current passes outside of the circuit wires and through an external object connected to ground. CAFI devices and GFI devices are typically circuit interrupters that are designed to interrupt the electrical current or trip, if an arc-fault or a ground-fault is detected.

Arcing faults are commonly defined as current through ionized gas between two ends of a broken conductor or at a faulty contact or connector, between two conductors supplying a load, or between a conductor and ground. However, arcing fault current levels can be small and may not cause a conventional circuit breaker to trip. Arcing fault current levels may be reduced by branch or load impedance to a level below the trip settings of the circuit breaker. In addition, an arcing fault that does not contact a grounded conductor or person, may not trip a ground-fault interrupter.

In the art of arc-fault detection, it is known to measure high frequency spectral components in the load current signature of an arcing load. If sufficient spectral content is present in certain frequency bands, this can be used to detect the arc-fault with protection software including a signal processing detection algorithm. A difficulty in detecting series arc-faults at a relatively lower amperage, is to correctly measure the amplitude of high frequency components. The amplitude of these high frequency components is reduced at the low arcing current levels of a series arc-fault. This is worsened where inductive loads, such as an electric motor, may be present in series with the arc, since these loads tend to attenuate the amplitude of the high frequency signature. An additional problem may be presented by the presence of electronic equipment that provides capacitive filtering of the power line, effectively shorting out part of the high frequency signal.

Modern DF/CAFI devices include components such as a microprocessor, memories, filters, analog-to-digital converters, and other supporting components. The microprocessor analyzes the current, ground-fault and rise time (di/dt) signals. By means of an arc-fault detection algorithm in the protection software, the microprocessor makes a trip decision, using the presence of broadband noise and the current peaks and current rise time (di/dt). One such arc-fault detection algorithm is described in U.S. Pat. No. 6,259,996, issued Jul. 10, 2001, the disclosure of which is incorporated herein by reference.

As new protection software becomes available for better arc-fault detection, it becomes impossible to update existing DF/CAFI devices in the field. With existing hardware and protection software, the updating of the protection software is not possible unless the device is opened and the microprocessor's debug port is used or if additional pins are wired through the device's housing. If the protection software is inadequate and allows nuisance tripping from new loads coming to market, changing the protection software requires changing the whole device.

What is needed is a way to rapidly and conveniently install updated arc-fault detection protection software in a DF/CAFI device without requiring any hardware changes to the device.

BRIEF SUMMARY OF THE INVENTION

In accordance with an example embodiment of the invention, a current interrupting device is operated in a maintenance mode to update its arc-fault detection protection software, by downloading updated protection software over the power line for which it serves as a current interrupter. Information signals are received on the power line, representing the updated arc-fault detection protection software. The information signals are sensed on the power line by a current sensor coupled to a sensor input terminal of the device. In accordance with an example embodiment of the invention, a processor executing maintenance software in the current interrupting device loads the updated arc-fault detection protection software into a memory of the device. The arc-fault detection protection software is updated without requiring any hardware changes to the device. Later, when the current interrupting device is operating in a protection mode, it will interrupt current in the power line in response to an arc-fault identified by the updated arc-fault detection protection software executed by the processor. Examples of the current interrupting device include an arc-fault circuit interrupter (AFCI), a combination arc-fault circuit interrupter (CAFI) device (series arc-fault and parallel arc-fault interrupter), a dual function/combination arc-fault circuit interrupter (DF/CAFI) device, and a ground-fault circuit interrupter (GFCI).

More particularly, an example embodiment of the invention performs updating of arc-fault detection protection software in a dual function/combination arc-fault circuit interrupter (DF/CAFI) device, without requiring any hardware changes to the device. Maintenance software running in a processor in the DF/CAFI device, synchronizes downloading the updated arc-fault detection protection software as packets of modulated data from a host device, downloaded over the power line connected to breaker contacts of the DF/CAFI device. The modulated data on the power line is sensed by the current sensor of the DF/CAFI device, and is filtered, demodulated, and sampled by the device. The maintenance software in the DF/CAFI device then assembles packets of the demodulated and sampled data and loads them into the memory in the DF/CAFI device as the updated arc-fault detection protection software.

The resulting invention installs the updated arc-fault detection protection software in a current interrupting device without requiring any hardware changes to the device.

BRIEF DESCRIPTION OF THE DRAWINGS

Example embodiments of the invention are depicted in the accompanying drawings that are briefly described as follows:

FIG. 1B is an example network diagram illustrating transmission from the host device to the DF/CAFI device shown in FIG. 1A, of packets of carrier signals modulated by the updated protection software.

FIG. 2A is an example functional block diagram of a receiving channel of the DF/CAFI device of FIG. 1, showing existing hardware and new maintenance software in the device that loads the updated protection software into memory in the device.

FIG. 2B is an example functional block diagram of the existing hardware in the receiving channel of FIG. 2A, providing a more detailed view of the analog front end (AFE), which comprises three channels. Each channel is a Fast Recharge Accumulator Block (FRAB) that includes a band pass filter, a diode that works like an amplitude demodulator, and a passive low pass filter that is connected to an analog-to-digital converter (ADC).

FIG. 4 is an example memory address map diagram showing the ROM/Flash memory address space allocated to the bootloader, existing protection software, maintenance software, maintenance flag, and time saver diagnostics (TSD) region. Also shown is the RAM memory address space allocated to copying the maintenance software in the maintenance mode and loading the new protection software image.

FIG. 5 is an example flow diagram illustrating switching between the maintenance mode and the protection mode.

FIG. 6 is an example flow diagram illustrating example details of a step in the flow diagram of FIG. 5, detailing the operation of the maintenance software in the maintenance mode.

FIG. 7 is an example flow diagram illustrating example details of a step in the flow diagram of FIG. 6, of receiving from the host device packets of the updated protection software.

FIG. 9 is an example symbol diagram of two carrier signals modulated together as a symbol by two-dimensional pulse amplitude modulation (2dPAM), which utilizes two FRABs with different frequency levels to increase the number of symbols per sample, where each frequency level combined with the other corresponds to a unique symbol.

FIG. 10 is an example symbol diagram of three carrier signals modulated together as a symbol by three-dimensional pulse amplitude modulation (3dPAM), which utilizes three FRABs with different frequency levels to increase the number of symbols per sample, where each frequency level combined with the other corresponds to a unique symbol.

DETAILED DESCRIPTION OF EMBODIMENTS OF THE INVENTION

Figure 1:
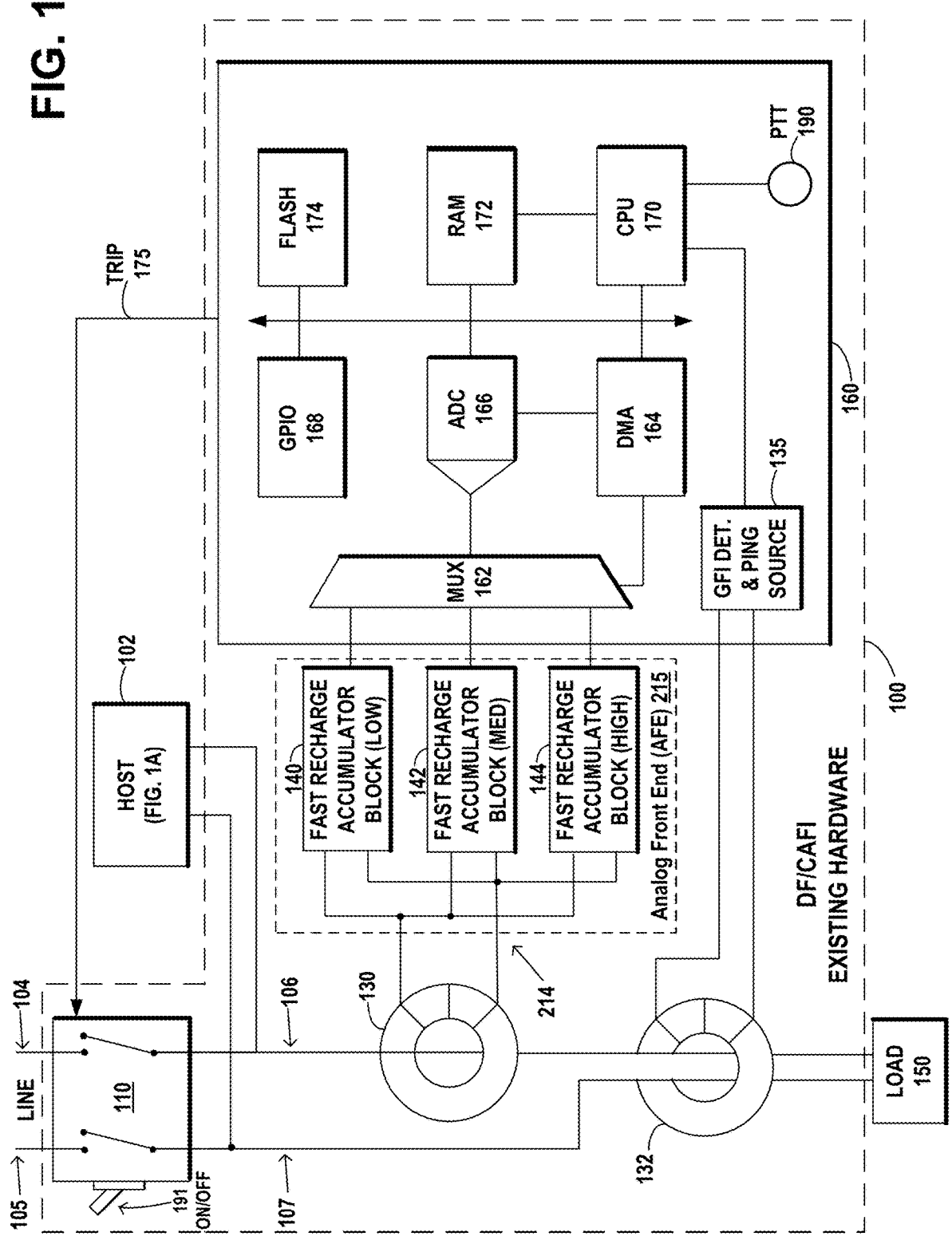
FIG. 1 is an example functional block diagram of the existing hardware of a dual function/combination arc-fault circuit interrupter (DF/CAFI) device. Also shown is a host device that provides updated protection software over an electric power line connected to breaker contacts of the device.

FIG. 1 is an example functional block diagram of the existing hardware of a current interrupting device, in particular a dual function/combination arc-fault circuit interrupter (DF/CAFI) device 100. The existing hardware of the device 100 includes a current sensor, in particular a current transformer 130 having the electric power line or branch line 106 serving as its primary. The secondary coil of the current transformer 130 is connected to a sensor input terminal 214 of the DF/CAFI device, in particular to the inputs of three fast recharge accumulator blocks (FRABs) 140, 142, and 144. FRAB 140 includes a low frequency band pass filter, FRAB 142 includes a medium frequency band pass filter, and FRAB 144 includes a high frequency band pass filter. The low, medium, and high frequency components of the current or the information signals sensed by the current transformer 130, are input by the FRABs 140, 142, and 144 to the controller 160. The controller 160 includes a multiplexor (MUX) 162, a direct memory access (DMA) 164, an analog-to-digital converter (ADC) 166, a general purpose I/O (GPIO) 168, a processor or microprocessor CPU 170, and an associated memory that includes a RAM 172, and a flash memory 174.

In a protection mode, the FRABs 140, 142, and 144 are used for detection of High Frequency content in the power line during an arc-fault event and are used to trigger counting potential arc-fault events. In accordance with the invention, in a maintenance mode, the FRABs are used to represent modulated pulses at their carrier frequencies as high or low peaks, which are converted to binary 1 and 0 by the CPU 170.

With the DF/CAFI device 100 operating in protection mode, the breaker contacts 110 are closed and power from the main power lines 104 and 105 is applied by the branch or power lines 106, 107 to the load 150. The device 100 has an existing version of arc-fault detection protection software stored in the flash memory 174, which is executed by the processor or microprocessor CPU 170, to monitor for arc-faults and ground-faults. In protection mode, the microprocessor CPU 170 analyzes the low, medium, and high frequency components of the current sensed by the current transformer 130. By means of an arc-fault detection algorithm in the existing version of the protection software, the microprocessor CPU 170 may make a trip decision, using the presence of broadband noise and the current peaks and current rise time (di/dt). If a trip decision is made, a trip signal 175 is sent by the controller 160 to the breaker contacts 110 to disconnect from the main power lines 104 and 105 and interrupt the current to the load 150.

In accordance with an example embodiment of the invention, to update the existing arc-fault detection protection software stored in the flash memory 174, the DF/CAFI device 100 may be switched to the maintenance mode by activating a sequence of push-to-test (PTT) 190 and ON/OFF 191 switches, as would be commonly understood by those of skill in the art. During the updating process, the breaker contacts 110 are open. An example host device 102 shown in more detail in FIG. 1A, may be configured to provide updated arc-fault detection protection software as packets of modulated data over the power line 106 to the DF/CAFI device 100.

Figure 1A:
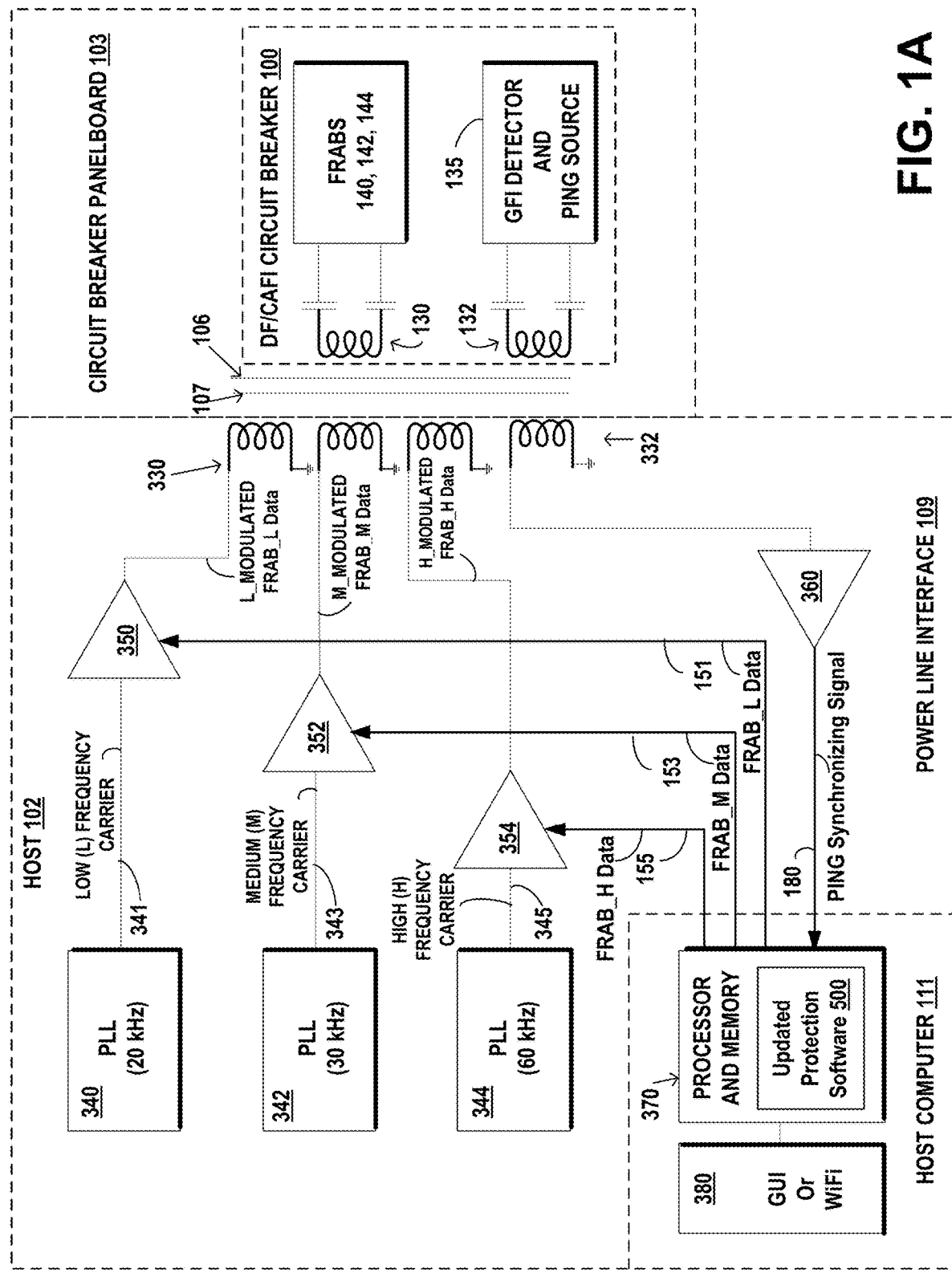
FIG. 1A is an example functional block diagram illustrating an example use case, of the DF/CAFI device of FIG. 1, as a miniature circuit breaker in a panelboard. An example host device has current transformers, such as split-core current transformers, clipped onto the branch circuit of the circuit breaker, to provide the updated protection software to the circuit breaker.

FIG. 1A is an example functional block diagram illustrating an example use case, of the DF/CAFI device 100 of FIG. 1, as a miniature circuit breaker in a panelboard 103. An example host device 102 has current transformers 330 and 332, such as split-core current transformers, clipped onto the respective branch circuit power line 106 and the neutral line 107 to the circuit breaker, to provide the updated protection software to the circuit breaker 100.

The example host device 102 may include a power line interface 109 and a host computer 111. The example host computer 111 may be either an integrated microcontroller or a separate computing device, such as a personal computer or smart phone connected by means of a USB port or other connection to the power line interface 109. In either case, the example host computer 111 may include a processor and associated memory 370 that stores the updated arc-fault detection protection software 500 to be provided to the circuit breaker 100. The example host device 102 may include a user interface 380, such as graphical user interface (GUI), a memory chip interface (e.g., a thumb drive), or a WiFi internet interface, to receive from the user or a server over the internet, the updated arc-fault detection protection software 500. The size of the updated arc-fault detection protection software 500 may range from 10 K bytes to over 1 Megabytes, depending on the complexity of the arc-fault protection algorithm in the software 500.

The example powerline interface 109 may include one or more signal generators 340, 342, and 344 to provide one or more carrier signals 341, 343, and 345, for example a low frequency carrier 341 at 20 kHz, a medium frequency carrier 343 at 30 kHz, and a high frequency carrier 345 at 60 kHz. The example host computer 111 may output the updated arc-fault detection protection software 500 from its memory, as one or more component units of data, such as one or more serial strings of four bytes (32 bits) each. The component units of data are referred herein to as "original FRAB data", each of which modulates a respective one or more of the carrier signals 341, 343, and 345 by means of respective operational amplifiers 350, 352, and 354. Original FRAB_L data 151 output by the host computer 111, modulates the low frequency carrier 341 at 20 kHz to produce L_modulated FRAB_L data that drives a first one of the current transformers 330. Original FRAB_M data 153 output by the host computer 111, modulates the medium frequency carrier 343 at 30 kHz to produce M_modulated FRAB_M data that drives a second one of the current transformers 330. Original FRAB_H data 155 output by the host computer 111, modulates the high frequency carrier 345 at 60 kHz to produce H_modulated FRAB_H data that drives a third one of the current transformers 330. The updated arc-fault detection protection software 500 is transmitted on the power line 106 as packets of the L_modulated FRAB_L data, M_modulated FRAB_M data, and H_modulated FRAB_H data, which are sensed by the current transformer 130 of the circuit breaker 100 and bandpass filtered by the FRABs 140, 142, or 144.

An example modulation scheme for the data is pulse amplitude modulation (PAM). However, other possible modulation schemes may be used, depending on the bandwidth and channel isolation between each FRAB 140, 142, or 144.

Returning to FIG. 1, the DF/CAFI device 100 also includes a ground-fault detecting current transformer 132 having both power line 106 and neutral line 107 serving as its primary and having its secondary coil connected to the terminal of a GFI detector and PING synchronizing signal source 135 in the controller 160. With the device 100 operating in protection mode, the ground-fault detecting current transformer 132 senses when the currents in the power lines 106 and 107 are not the same magnitude, and outputs a signal to the GFI detector 135, resulting in a trip signal being sent over line 175 to the breaker contacts 110. In the software maintenance mode, the GFI detector and PING synchronizing signal source 135 is used for feedback acknowledgement (ACK) signaling to the host 102. The PING synchronizing signal 180 is generated utilizing a resonance of the current transformer 132 to issue a fast rise time current (di/dt), similar to a sharp pulse, on the secondary of the current transformer 132, causing it to start resonating. The host 102 may detect the impedance changes on the neutral wire 107 due to the resonance of the current transformer 132, resulting in a feedback signal 180 to the host 102. The feedback signal 180 is used to synchronize downloading from the host device 102, over the power line 106 to the DF/CAFI device, the updated arc-fault detection protection software 500 as packets of the L_modulated FRAB_L data, M_modulated FRAB_M data, and H_modulated FRAB_H data. Additional details of the how the PING synchronizing signal 180 may be generated, are described in U.S. Pat. No. 7,193,827, issued Mar. 20, 2007, the disclosure of which is incorporated herein by reference.

FIG. 1B is an example network diagram illustrating transmission of packets 182 from the example host device 102 to the DF/CAFI device 100 shown in FIGS. 1 and 1A. The packets 182 are carrier signals modulated by data representing component units (the original FRAB data 151, 153, 155) of the updated arc-fault detection protection software 500. To maximize data rates for transferring the updated arc-fault detection protection software 500 from the host device 102 to the DF/CAFI device 100, the example host computer 111 may simultaneously output the original FRAB_L data 151, original FRAB_M data 153, and original FRAB_H data 155. This results in the packets 182 transmitted on the power line 106 having overlapped, modulated carrier signals for the L_modulated FRAB_L data, M_modulated FRAB_M data, and H_modulated FRAB_H data. When the overlapped, modulated carrier signals arrive at the DF/CAFI device 100, they are separated by their carrier frequencies via the respective bandpass filters of the FRABs 140, 142, or 144 and separately demodulated. FRAB 140 outputs filtered and demodulated FRAB_L output data 260. FRAB 142 outputs filtered and demodulated FRAB_M output data 265. And FRAB 144 outputs filtered and demodulated FRAB_H output data 267. The FRAB outputs 260, 265, and 267 are filtered and demodulated data representing the component units (the original FRAB data 151, 153, 155) of the updated arc-fault detection protection software.

Figure 1C:
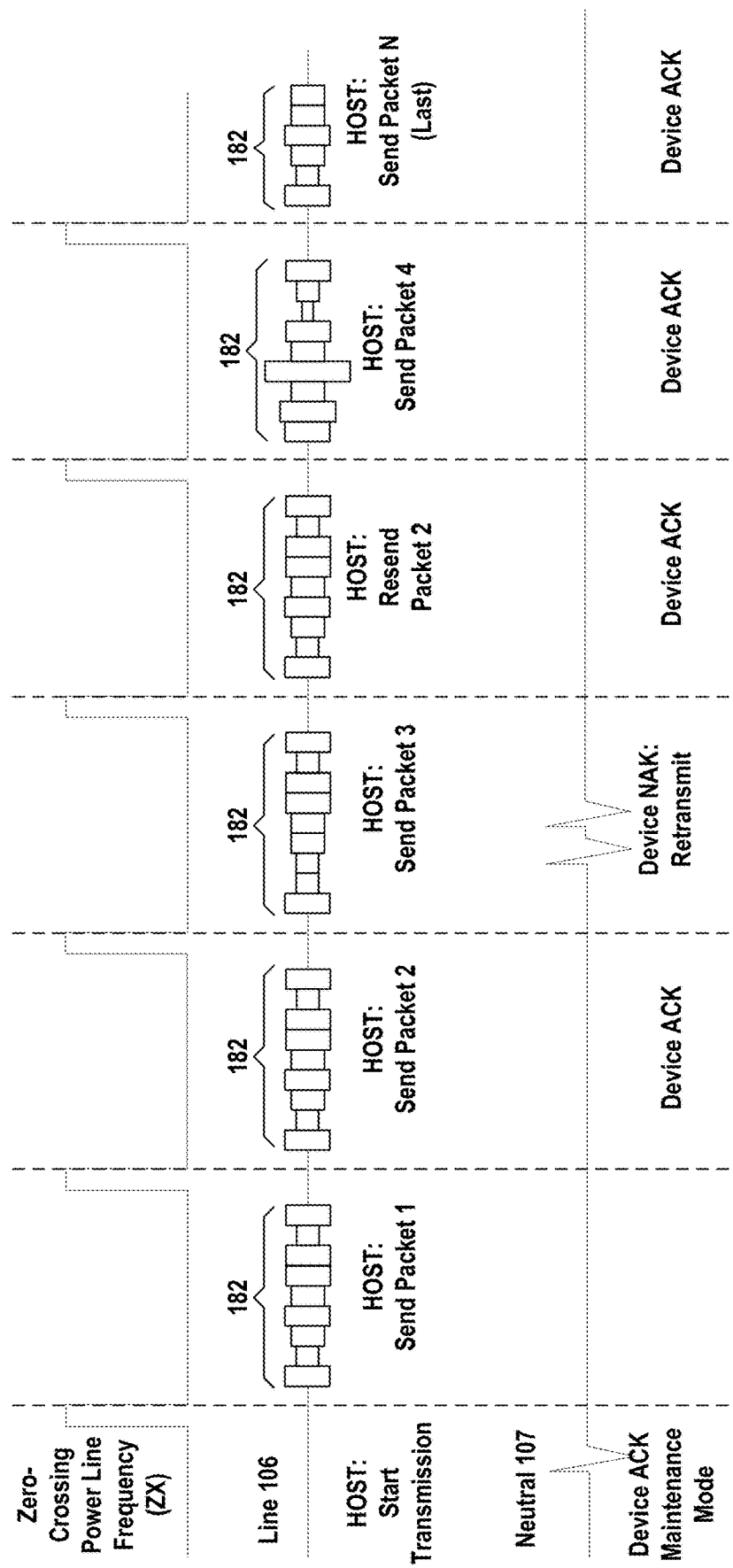
FIG. 1C is an example timing diagram illustrating the use of the power line frequency to establish a time base for the transmission of the packets of carrier signals modulated by the updated protection software, from the host device to the DF/CAFI device shown in FIG. 1B.

FIG. 1C is an example timing diagram illustrating the use of the power line frequency by the DF/CAFI device 100 of FIG. 1B, to establish a time base for synchronizing the receipt of the packets 182 of carrier signals modulated by the updated protection software, from the host device 102. The power line 106 may have an example frequency of 60 Hz, which has two zero-crossings (ZX) per cycle, establishing a 120 Hz time base. The interval between two consecutive zero-crossings (ZX) is referred to as a FRAB half-cycle. This time base is used for the operation of transferring the packets 182 of the updated arc-fault detection protection software 500 from the host device 102 to the DF/CAFI device 100.

The top waveform in the diagram represents the 120 Hz zero-crossing (ZX) of the 60 Hz line 106. The bottom waveform in the diagram represents the PING synchronizing signal 180 generated by the GFI detector and PING synchronizing signal source 135 in the DF/CAFI device 100. After the user activates a sequence of push-to-test (PTT) 190 and ON/OFF 191 switches, the breaker contacts 110 remain open. The DF/CAFI device 100 starts by issuing a PING signal 180 to the host device 102. The DF/CAFI device 100 waits for the next zero-crossing (ZX) and then enables its timer for acquisition of the packets 182 of carrier signals modulated by the updated protection software, on the low frequency FRAB_L 140, medium frequency FRAB_M 142, and high frequency FRAB_H 144 channels. The DF/CAFI device 100 waits for the next zero-crossing (ZX) and continues to receive the packets 182, as shown in the middle waveform in the diagram. If the received packets fail a validity check, the DF/CAFI device 100 issues two PING signals 180 as a negative acknowledgement (NACK) and waits for the next zero-crossing (ZX) for a retransmission of the failed packet from the host 102. When the last packet 182 is received, the transfer process stops.

Examples of the current interrupting device 100 may include an arc-fault circuit interrupter (AFI), a combination arc-fault circuit interrupter (CAFI) device (series arc-fault and parallel arc-fault interrupter), a dual function/combination arc-fault circuit interrupter (DF/CAFI) device, and a ground-fault circuit interrupter (GFCI) all in circuit breaker, and especially miniature circuit breaker, form.

FIG. 2A is an example functional block diagram of a receiving channel 200 of the DF/CAFI device 100 of FIG. 1, showing the existing hardware of the sensor or current transformer 130, the analog front end (AFE) 215, and the analog-to-digital converter (ADC) 166. Also shown is the new maintenance software 520 downloading the updated protection software 500 via the receiving channel 200. The receiving channel 200 senses the modulated data packets 182 on the power line 106 by the current transformer 130. The modulated data packets 182 are information signals received on the power line during the maintenance mode. The packets 182 are carrier signals modulated by data representing component units (the original FRAB data 151, 153, and 155) of the updated arc-fault detection protection software 500. The modulated data packets 182 are filtered and demodulated by the FRABS 140, 142, and 144, which output filtered and demodulated FRAB output data 260, 265, and 267 representing the component units (the original FRAB data 151, 153, and 155) of the updated arc-fault detection protection software 500.

In accordance with example embodiments of the invention, the new maintenance software 520 interprets the modulated data packets 182 as high or low peaks, which are sampled by the ADC 166 and converted to binary 1 and 0 values by the CPU 170. Each channel of the filtered and demodulated FRAB output data 260, 265, and 267 is sampled by the ADC 166. The sampled values are digitized by the CPU 170 to reproduce the component units (the original FRAB data 151, 153, and 155) of the updated arc-fault detection protection software 500, from the received information signals or packets 182. This is done by the CPU 170 comparing with a threshold 225 to detect voltage levels for binary values (0, 1). The binary values are packetized or assembled 230 in the RAM 172 as the reproduced component units (i.e., reproduced or recovered versions of the original FRAB data 151, 153, and 155). The reproduced component units are validated, for example, with an error checking and correction (ECC) block 235 to form "validated data". The validated, reproduced component units are then loaded into the Non-Volatile (Flash) memory 174, as the updated arc-fault detection protection software.

FIG. 2B is an example functional block diagram of the existing hardware in the receiving channel 200 of FIG. 2A, providing a more detailed view of the analog front end (AFE) 215. The current sensor 130 is coupled to a sensor input terminal 214 of the current interrupting device 100, configured to sense information signals or packets 182 provided on the power line 106. The information signals or packets 182 are carrier signals modulated by data representing component units (the original FRAB data 151, 153, 155) of the updated arc-fault detection protection software 500.

The analog front end (AFE) 215 comprises three channels, each channel being a Fast Recharge Accumulator Block (FRAB) 140, 142, or 144. Each FRAB includes a respective band pass filter 141, 143, or 145, a respective diode 240, 242, or 244 that works similar to an amplitude demodulator, and a respective passive low pass filter 250, 252, or 254 that is connected to the analog-to-digital converter (ADC) 166. Each FRAB is configured to pass a respective frequency carrier signal modulated by the updated arc-fault detection protection software, which has been sensed on the power line 106 by the current sensor 130. The output of each band pass filter 141, 143, or 145 is referred to as filtered information signals. For example, in the low frequency FRAB_L 140, the filtered information signals output from the band pass filter 141 (active filter with some gain) go through the diode 240 and then through the passive low pass filter (RC) 250, which is connected to the ADC 166. The low frequency FRAB_L 140 outputs filtered and demodulated FRAB_L output data 260 to the ADC 166, representing the component units (the original FRAB_L data 151) of the updated arc-fault detection protection software. In the medium frequency FRAB_M 142, the filtered information signals output from the band pass filter 143 go through the diode 242 and then through the passive low pass filter (RC) 252, which is connected to the ADC 166. FRAB_M 142 outputs filtered and demodulated FRAB_M output data 265 to the ADC 166. In the high frequency FRAB_H 144, the filtered information signals output from the band pass filter 145 go through the diode 244 and then through the passive low pass filter (RC) 254, which is connected to the ADC 166. FRAB_H 144 outputs filtered and demodulated FRAB_H output data 267 to the ADC 166.

Figure 2C:
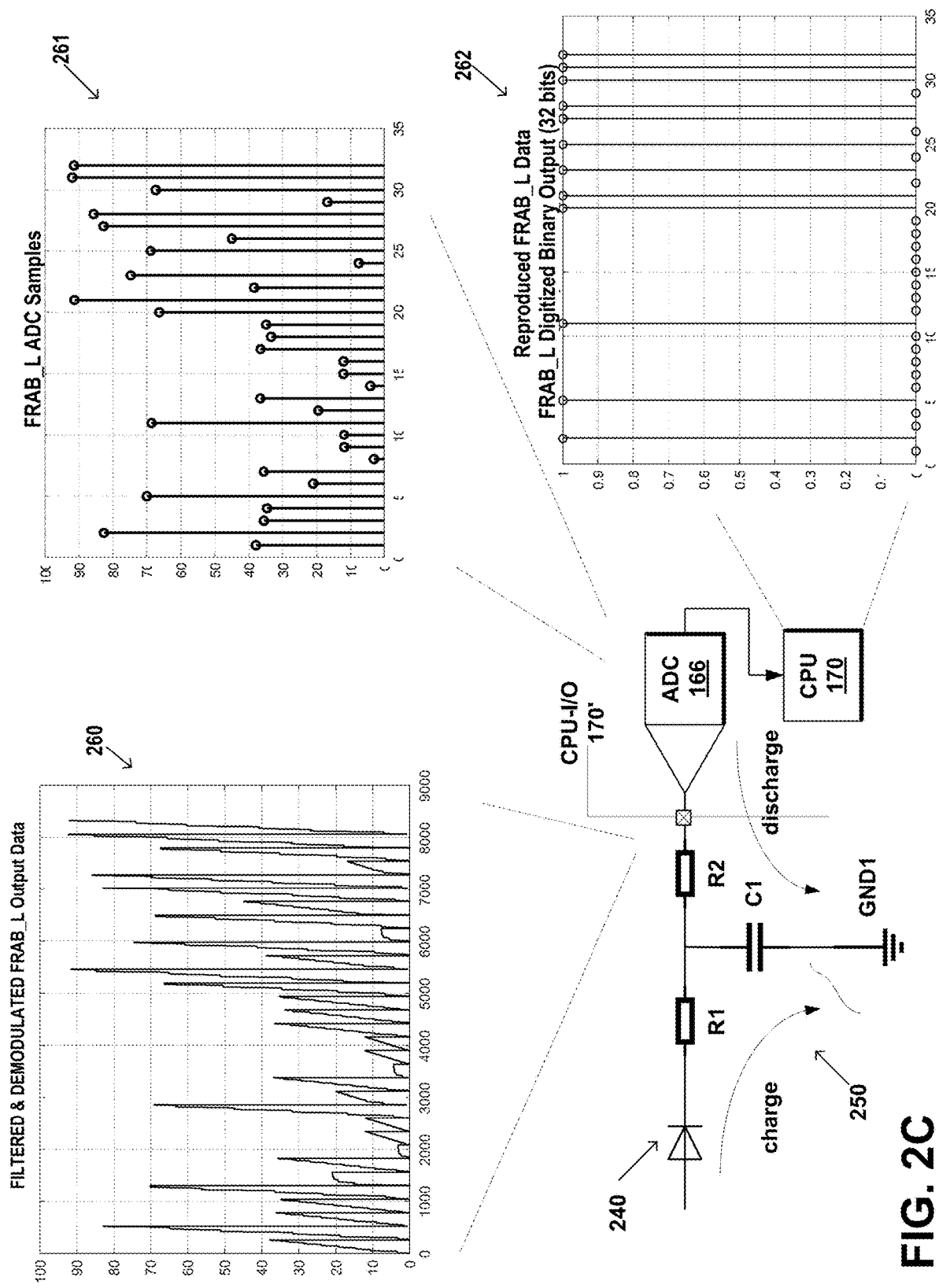
FIG. 2C is an example functional block and circuit diagram of the passive low pass filter in one of the FRABs and the ADC in the existing hardware in the receiving channel of FIG. 2B. Example waveform diagrams show progressive stages in reproducing the updated protection software received by the DF/CAFI device from the host device, including filtered and demodulated data output by one of the FRABs, data samples output by the ADC, and digitized binary data output by the CPU for loading in the memory of the DF/CAFI device.

FIG. 2C is an example functional block diagram of the passive low pass filter 250 in the low frequency FRAB_L 140 and the ADC 166 in the existing hardware in the receiving channel 200 of FIG. 2B. Example waveform diagrams show progressive stages in reproducing the updated protection software 500 received by the DF/CAFI device 100 from the host device 120. Example waveform diagrams include filtered and demodulated FRAB_L output data 260 that is output by the low frequency FRAB_L 140, data samples 261 output by the ADC 166, and digitized binary data 262 output by the CPU 170 for loading in the RAM memory 172 of the DF/CAFI device 100. Similar descriptions apply also to the medium frequency FRAB_M 142 and the high frequency FRAB_H 144.

In the software maintenance mode, the low frequency FRAB_L 140 output data 260 is sampled by the ADC 166 at the peak values before the capacitor C1 is discharged, as shown in waveform 261 for ADC sampled values. The ADC sampled values are then processed in the CPU 170 and a threshold is applied digitally to convert the ADC sampled values to binary representation (0, 1), as shown in waveform 262 for FRAB_L digitized binary output. The waveform 262 shows a sequence of binary "1"s and binary "0"s, as an example of reproducing or recovering the original FRAB_L data 151. The filtered and demodulated FRAB_L output data 260 is sampled by the ADC 166 and digitized by the CPU 170 to reproduce the component units (the original FRAB_L data 151) of the updated arc-fault detection protection software 500 from the received information signal packet 182.

In the low frequency FRAB_L 140, for example, the diode 240 will charge the capacitor C1, depending on the RC time constant and on the amplitude of the demodulated signal. If the demodulated signal is very strong (a max amplitude of the carrier signal at the center of the bandpass filter) it will charge the capacitor C1 within the allocated 250 us time up to Vdd. Otherwise the FRAB output will be low if the carrier is not present. The FRAB serves as a passive integrator for the sampling time between CPU discharges. The RC time constant is set to correspond with the ADC 166 sampling time, and then the maintenance software causes the CPU 170 to discharge the capacitor C1. After the ADC 166 samples the voltage, the microprocessor CPU 170 reconfigures its I/O pin 170' and changes it to a digital input with pull down, which discharges the capacitor C1, and then reconfigures the I/O pin 170' back to an analog input to allow the capacitor C1 to charge again. In the protection mode, this serves as a clock to trigger counting blocks, or FRAB count values, to detect the presence of arc-fault noise at a certain frequency, based on the band pass filter 141. To summarize, in the protection mode, the FRABs are used for detection of High Frequency content in the power line during an arc-fault event and are used to trigger counting potential arc-fault events. By contrast, in the maintenance mode, the FRABs are used to represent modulated pulses at their carrier frequencies as high or low peaks, which are converted to binary 1 and 0 by the CPU 170.

In an alternate embodiment, in the protection mode. the FRAB count values may be correlated between other frequency bands of band pass filters 143 and/or 145, to confirm that an arc-fault is present, as distinguished from the noise generated by some kind of load that might generate noise only in a certain frequency range, e.g. radio interference, etc.

In the software maintenance mode, the FRAB output is sampled to detect voltage levels for binary values (0, 1). In an example alternate embodiment, the FRAB output may be sampled to detect voltage levels for more than two levels, to be used in more compact non-binary symbols.

Figure 3:
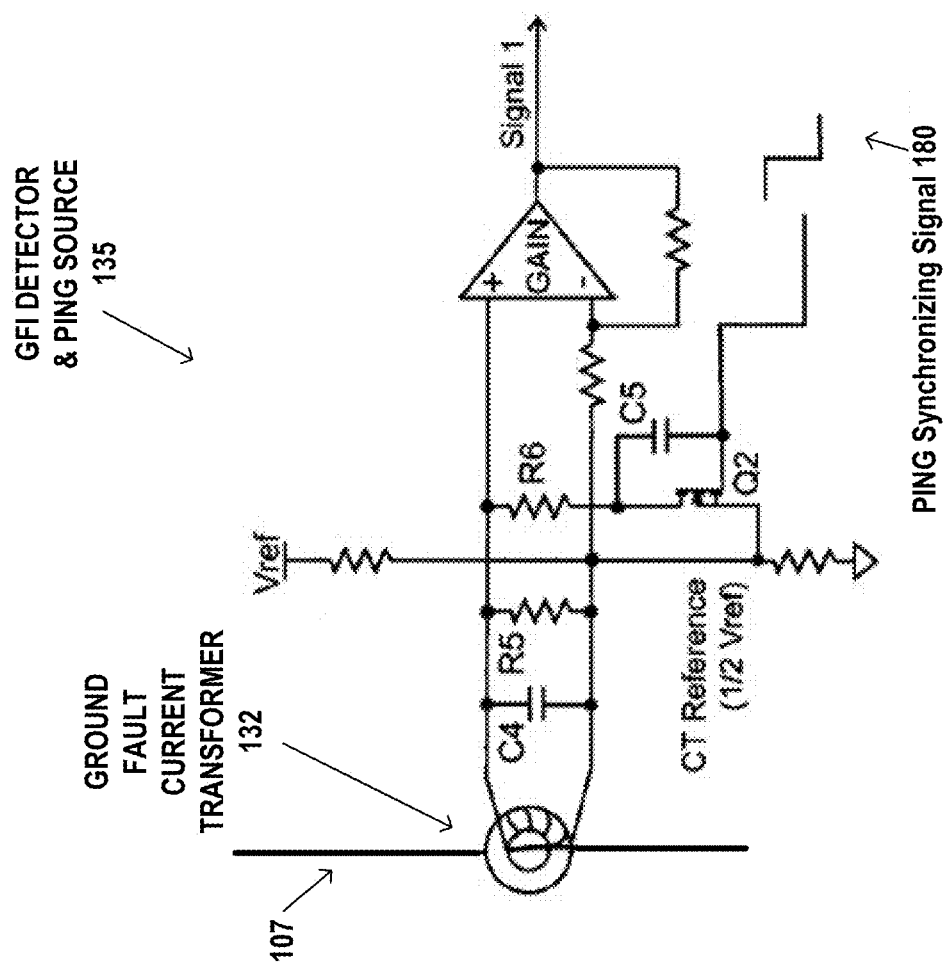
FIG. 3 is an example circuit diagram of the GFI detector and PING synchronizing signal source in the DF/CAFI device of FIG. 1, used for feedback acknowledgement (ACK) in the maintenance mode.

FIG. 3 is an example circuit diagram of the GFI detector and PING synchronizing signal source 135 in the DF/CAFI device 100 of FIG. 1. In the protection mode, the GFI detector utilizes a PING circuit that serves as a test circuit to measure the resonant frequency of the ground fault current transformer 132, and also as a grounded neutral (GN) fault detector. In the protection mode, when the CPU 170 issues a PING (a sharp pulse) the burden resistor connected in parallel with the ground fault current transformer 132 is disconnected, which places the ground fault current transformer 132 in a resonating mode.

In maintenance mode, the PING circuit is used for a feedback acknowledgement signal (ACK), to synchronize downloading the updated arc-fault detection protection software as packets of modulated data from a host device 102, over the power line 106 to the DF/CAFI device. The PING synchronizing signals notify the host device 102 of an acknowledge (ACK) or non-acknowledge (NAK). The host may detect the impedance changes on the neutral wire 107 due to the resonance of the ground fault current transformer 132, resulting in a feedback signal to the host 102. In a grounded-neutral sensing mode, the switch Q2 is turned off by the Ping signal, which switches the gate voltage of the switch Q2 from high to low and generates a disturbance on the secondary of the current transformer 132 through capacitor C5. With R6 switched out of the circuit, the secondary of the current transformer 132 and the capacitor C4 are allowed to resonate with a small amount of damping provided by the high-impedance burden resistor R5. A grounded-neutral condition changes the impedance of the secondary winding of the current transformer 132 and dampens the oscillations sharply. See U.S. Pat. No. 7,193,827, issued Mar. 20, 2007, the disclosure of which is incorporated herein by reference. The host 102 can detect the impedance changes on line 107 due to the resonance of the current transformer 132.

FIG. 4 is an example memory address map diagram showing the ROM/Flash memory address space of the RAM 172 and flash memory 174 in the DF/CAFI device 100. The memory address space in the flash memory 174 is allocated to the bootloader 502, existing protection software 510, maintenance software 520, maintenance flag region 522, and time saver diagnostics (TSD) region 524, part of the human machine interface of a breaker, such as set forth in U.S. Pat. No. 8,243,411, incorporated herein by reference. The memory address space in the RAM 172 is allocated to copying the maintenance software 520' in the maintenance mode and loading the new protection software image 510'. The bootloader 502 copies the maintenance software 520 from the flash memory 174 to the RAM 172 as the maintenance software image 520' and sets the program counter (PC) to the entry point of the maintenance software image 520' in the RAM. In the example embodiment, the memory address space of the flash memory 174 continues with the memory address space of the of the RAM 172. In alternate example embodiments, a separate instruction memory may be provided for the maintenance software 520.

FIG. 5 is an example flow diagram 550 illustrating of example steps of switching between the maintenance mode and the protection mode. Depending on user selection when the DF/CAFI device 100 is turned ON (step 552), it can run in either protection mode or in maintenance mode. In protection mode the device continues with normal operation from the flash memory 174, which is the default operational mode. Instead, if a sequence of push-to-test (PTT) 190 and ON/OFF 191 switches are activated, the breaker contacts 110 remain open and the DF/CAFI device 100 enters the maintenance mode (step 560). If a maintenance mode timeout occurs (step 562), the maintenance mode flag 522 is cleared (step 564) and the breaker contacts 110 are tripped open (step 558). The maintenance process step 560 is shown in greater detail in FIG. 6.

FIG. 6 is an example flow diagram 600, illustrating example details of step 560 in the flow diagram of FIG. 5, detailing the operation of the maintenance software in the maintenance mode. The DF/CAFI device 100 enters the maintenance mode at step 601. To begin the maintenance mode, a maintenance flag 522 is set in flash memory 174 and the bootloader 502 copies the maintenance software 520 from the flash memory 174 to the RAM 172 as the maintenance software image 520' (step 602) and sets the program counter (PC) to the entry point of the maintenance software image 520' in the RAM (step 604). The CPU 170 then begins executing the maintenance software image 520' (step 606) to receive the ADC 166 sampled values of the filtered and demodulated FRAB output data 260, 265, and 267. If there is no timeout (step 608), the new image of the updated arc-fault detection protection software is validated (step 612), and if valid (step 614), the new image of the updated arc-fault detection protection software is written into the flash memory 174 (step 616). The TSD region 524 in the flash memory is cleared (step 618), the maintenance mode flag 522 is cleared (step 620) and the process stops (step 624). If the new image of the updated arc-fault detection protection software is determined to not be valid (step 614), then three PING synchronizing signals 180 are generated by the GFI detector and PING synchronizing signal source 135 to alert the host device 102, the maintenance mode flag 522 is cleared (step 620), and the process stops (step 624). The step 606 process of receiving data is shown in greater detail in FIG. 7.

FIG. 7 is an example flow diagram 700 illustrating example details of step 606 in the flow diagram of FIG. 6, of receiving from the host device packets of the updated protection software. The DF/CAFI device 100 starts (step 702) by issuing (step 704) a PING signal 180 to the host device 102. The DF/CAFI device 100 waits (step 706) for the next zero-crossing (ZX) of the power line frequency, and then enables its timer for acquisition of the packets 182 of carrier signals modulated by the updated protection software, on the low frequency FRAB_L 140, medium frequency FRAB_M 142, and high frequency FRAB_H 144 channels. The DF/CAFI device 100 processes the acquired data (step 710) and checks data integrity (step 712). If data integrity fails, then two PING synchronizing signals 180 are generated by the GFI detector and PING synchronizing signal source 135 to alert the host device 102 and, the process returns to step 706 for the next packet. If there is integrity, and if there are more packets (step 714), the process returns to step 706 for the next packet. If this is the last packet (step 714), then the process stops (step 718). The step 710 to process the acquired data is shown in greater detail in FIGS. 8A and 8B.

Figure 8A:
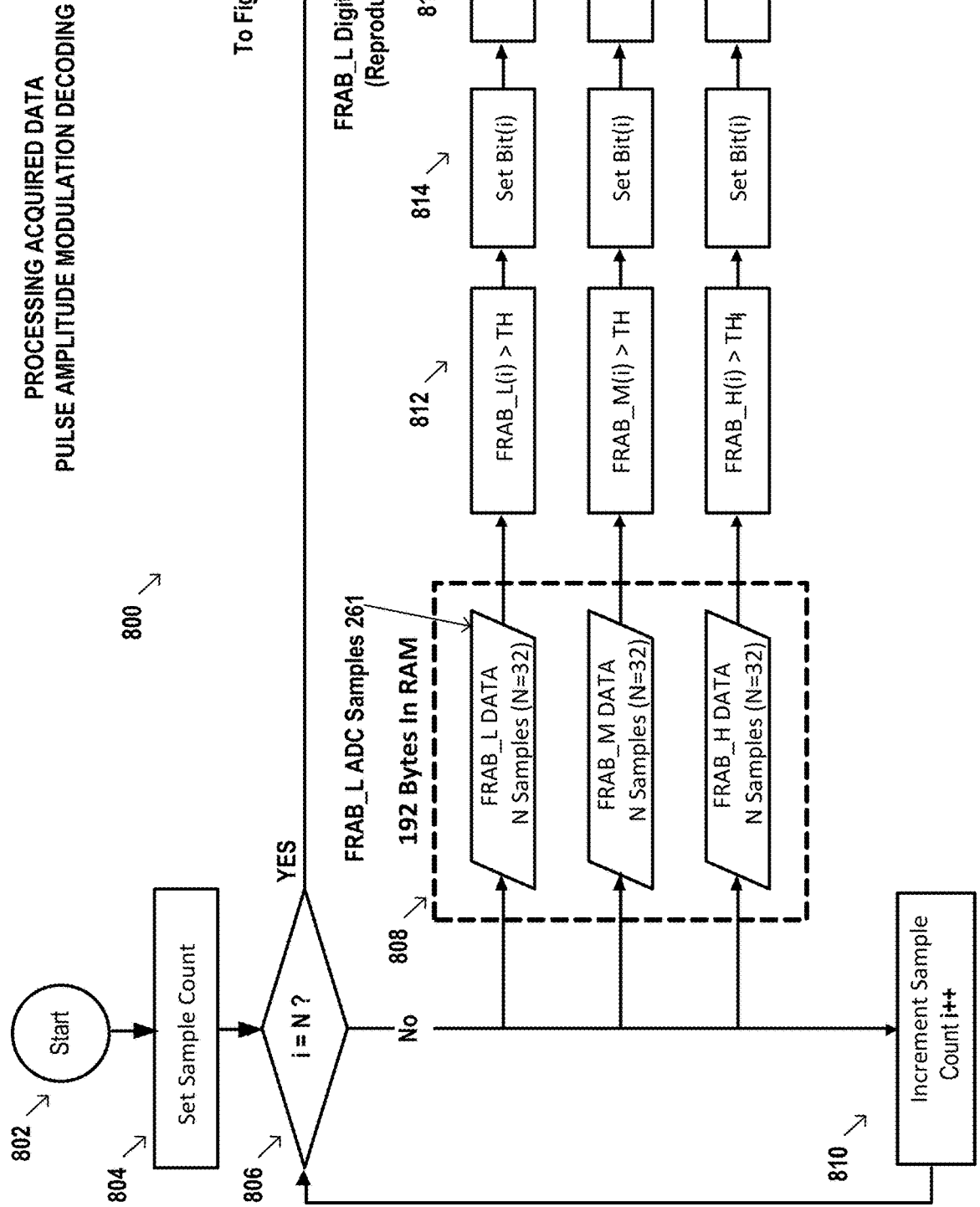
FIGS. 8A and 8B illustrate example details of a step in the flow diagram of FIG. 7, of processing the acquired data.
Figure 8B:
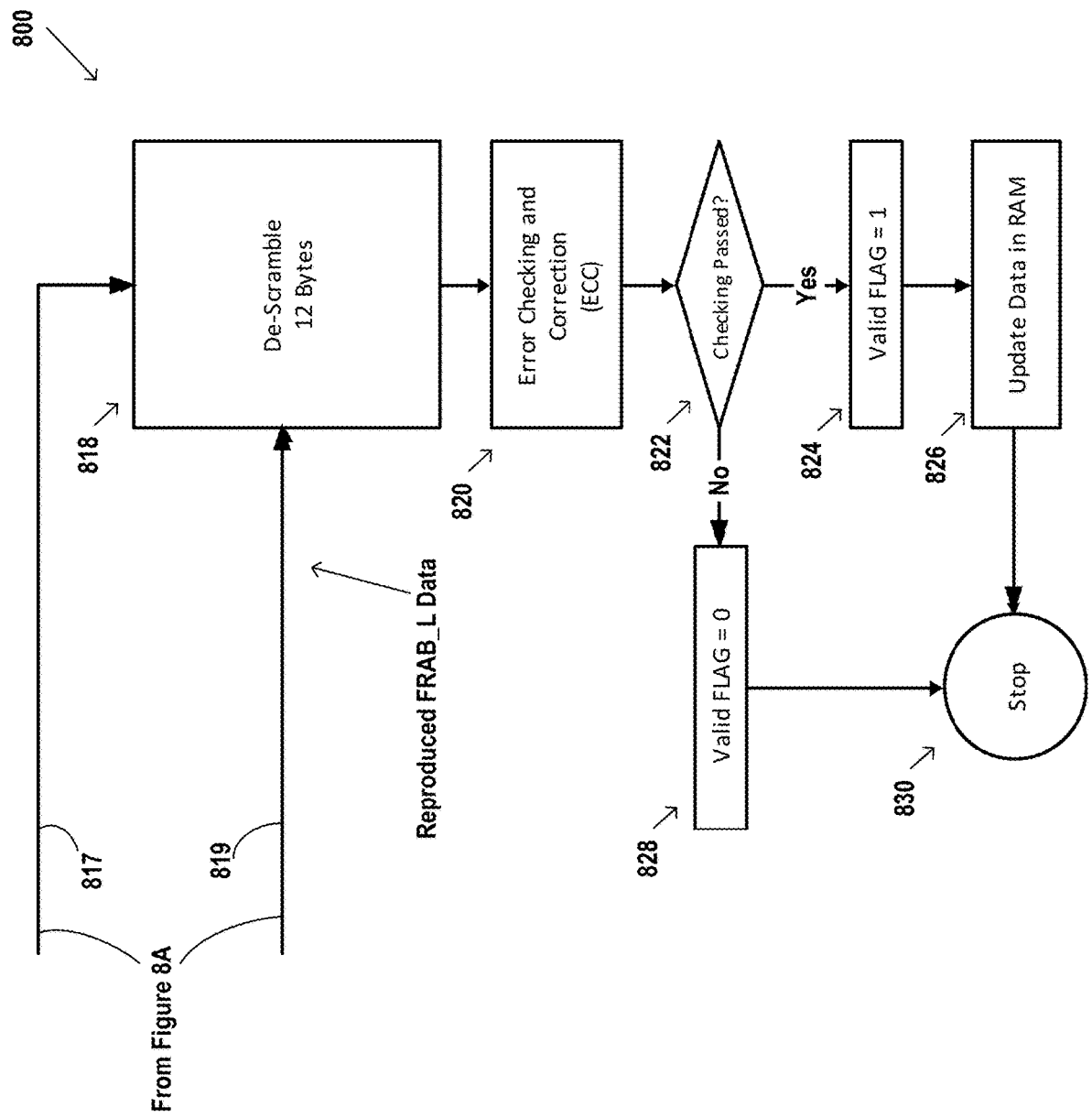

FIGS. 8A and 8B illustrate example details of a step 710 in the flow diagram of FIG. 7, of processing the acquired data. The interval between two consecutive zero-crossings (ZX) is referred to as a FRAB half-cycle. There are 32 samples for each FRAB per half-cycle. In FIG. 8A, step 802 starts the process and step 804 sets the sample count. Step 806 determines if 32 samples have been processed. Step 808 buffers samples in the RAM. Step 810 increments the sample count. For each sample, a threshold is applied (step 812) to convert or set (step 814) ADC sample values 261 to binary bits (0 and 1) of FRAB digitized binary output 262. The samples from each of the FRABs 140, 142, and 144 are packetized to 32 bits (4 Bytes)(step 816). A total of 12 Bytes per half-cycles can be received. Flowing from FIG. 8A to FIG. 8B at 817 and 819, a de-scrambler 818 may be applied to align received bytes to a known format, depending on the mapping of the bits received from each FRAB. Error checking and correction module (step 820) verifies that the received data is not corrupted. If corrupted data is detected and it cannot be corrected, a Valid FLAG is cleared (step 828) and the data is removed from memory. Otherwise, the Valid FLAG is set (step 824) and the new software image is saved in the RAM (step 826) until the last packet has been received. The process stops at step 830. Table 1 illustrates an example of transmitted bits within a half-cycle.

TABLE 1

An example of transmitted bits within a half-cycle:

| Random Data (12 Bytes) | Byte 3 | Byte 2 | Byte 1 | Byte 0 |
|---|---|---|---|---|
| FRAB-L (Low Band) | 11011010 | 10101010 | 11001110 | 10111101 |
| FRAB-M (Mid Band) | 11100011 | 11000010 | 11010101 | 00010001 |
| FRAB-H (High Band) | 00111111 | 10011001 | 00101100 | 10011110 |

FIG. 9 is an example symbol diagram of two carrier signals that are modulated together as a symbol by two-dimensional pulse amplitude modulation (2dPAM), which utilizes two FRABs with different frequency levels to increase the information per symbol. The combined frequency levels are represented by a unique symbol, which increases the data rate for transmitting the arc-fault detection protection software to the current interrupting device.

FIG. 10 is an example symbol diagram of three carrier signals modulated together as a symbol by three-dimensional pulse amplitude modulation (3dPAM), which utilizes three FRABs with different frequency levels to increase the information per symbol. The combined frequency levels are represented by a unique symbol, which increases the data rate for transmitting the arc-fault detection protection software to the current interrupting device.

The resulting invention installs updated arc-fault detection protection software in a current interrupting device, without requiring any hardware changes to the device. Examples of the current interrupting device include an arc-fault circuit interrupter (AFCI), a combination arc-fault circuit interrupter (CAFI) device (series arc-fault and parallel arc-fault interrupter), a dual function/combination arc-fault circuit interrupter (DF/CAFI) device, and a ground-fault circuit interrupter (GFCI).

Although specific example embodiments of the invention have been disclosed, persons of skill in the art will appreciate that changes may be made to the details described for the specific example embodiments, without departing from the scope of the invention as defined in the attached claims.

The invention claimed is:

1. A method, comprising:
  receiving, by a current interrupting device operating in a maintenance mode, data packet information signals downloaded over an electric power line for which the current interrupting device serves as a current interrupter of the electric power line, the data packet information signals sensed by a current sensor coupled to a sensor input terminal of the current interrupting device, the data packet information signals representing updated arc-fault detection protection software downloaded over the electric power line to be executed by a processor in the current interrupting device operating in a protection mode, the updated arc-fault detection protection software configured to cause the current interrupting device to interrupt current in the electric power line in response to an arc-fault identified by the arc-fault detection protection software when executed by the processor operating in the protection mode;
  loading, by the current interrupting device operating in the maintenance mode, the updated arc-fault detection protection software downloaded over the electric power line, into a memory in the current interrupting device associated with the processor; and replacing, by the current interrupting device operating in the maintenance mode, the existing arc-fault detection protection software by the updated arc-fault detection protection software downloaded over the electric power line to cause the current interrupting device to interrupt current in the electric power line in the protection mode, without requiring hardware changes to the current interrupting device.

2. The method of claim 1, further comprising:

wherein the data packet information signals received by the current interrupting device on the electric power line during the maintenance mode, are carrier signals modulated by data representing component units of the updated arc-fault detection protection software;

filtering and demodulating, by the current interrupting device operating in the maintenance mode, the received carrier signals to output filtered and demodulated data representing the component units of the updated arc-fault detection protection software;

sampling and digitizing, by the current interrupting device operating in the maintenance mode, the filtered and demodulated data to reproduce the component units of the updated arc-fault detection protection software from the received data packet information signals;

validating, by the current interrupting device operating in the maintenance mode, the reproduced component units of the updated arc-fault detection protection software; and loading, by the current interrupting device operating in the maintenance mode, the validated, reproduced component units of the updated arc-fault detection protection software, into the memory.

3. The method of claim 1, further comprising:

executing, by the processor in the current interrupting device operating in the maintenance mode, maintenance software configured to synchronize with a host device, downloading over the electric power line from the host device, the data packet information signals representing the updated arc-fault detection protection software; and the maintenance software further configured to cause the current interrupting device operating in the maintenance mode, to signal over a neutral line of the electric power line to the host device, with a synchronizing signal generated by causing a ground-fault detecting current transformer coupled to the neutral line to resonate, the synchronizing signal synchronizing the downloading of the data packet information signals from the host device.

4. The method of claim 1, further comprising:

executing, by the processor in the current interrupting device operating in the protection mode, the updated arc-fault detection protection software in the memory, to cause the current interrupting device to interrupt current in the electric power line in response to an arc-fault identified by the updated arc-fault detection protection software executed by the processor.

5. The method of claim 1, wherein the current interrupting device is at least one of an arc-fault circuit interrupter (AFI), a combination arc-fault circuit interrupter (CAFI) device, a dual function/combination arc-fault circuit interrupter (DF/CAFI) device, or a ground-fault circuit interrupter (GFCI).

6. A maintenance software computer program product comprising computer executable program code recorded on a computer readable non-transitory storage medium, the computer executable program code comprising:

code for receiving, by a current interrupting device operating in a maintenance mode, data packet information signals downloaded over an electric power line for which the current interrupting device serves as a current interrupter of the electric power line, the data packet information signals sensed by a current sensor coupled to a sensor input terminal of the current interrupting device, the data packet information signals representing updated arc-fault detection protection software downloaded over the electric power line to be executed by a processor in the current interrupting device operating in a protection mode, the updated arc-fault detection protection software configured to cause the current interrupting device to interrupt current in the electric power line in response to an arc-fault identified by the arc-fault detection protection software when executed by the processor operating in the protection mode;

code for loading, by the current interrupting device operating in the maintenance mode, the updated arc-fault detection protection software downloaded over the electric power line, into a memory in the current interrupting device associated with the processor; and code for replacing, by the current interrupting device operating in the maintenance mode, the existing arc-fault detection protection software is replaced by the updated arc-fault detection protection software downloaded over the electric power line to cause the current interrupting device to interrupt current in the electric power line in the protection mode, without requiring hardware changes to the current interrupting device.

7. The maintenance software computer program product of claim 6, further comprising:

wherein the data packet information signals received by the current interrupting device on the electric power line during the maintenance mode, are carrier signals modulated by data representing component units of the updated arc-fault detection protection software;

code for filtering and demodulating, by the current interrupting device operating in the maintenance mode, the received carrier signals to output filtered and demodulated data representing the component units of the updated arc-fault detection protection software;

code for sampling and digitizing, by the current interrupting device operating in the maintenance mode, the filtered and demodulated data to reproduce the component units of the updated arc-fault detection protection software from the received data packet information signals;

code for validating, by the current interrupting device operating in the maintenance mode, the reproduced component units of the updated arc-fault detection protection software; and code for loading, by the current interrupting device operating in the maintenance mode, the validated, reproduced component units of the updated arc-fault detection protection software, into the memory.

8. The maintenance software computer program product of claim 6, further comprising:

code for synchronizing, by the current interrupting device operating in the maintenance mode, with a host device, downloading over the electric power line from the host device, the data packet information signals representing the updated arc-fault detection protection software; and code for causing the current interrupting device operating in the maintenance mode, to signal over a neutral line of the electric power line to the host device, with a synchronizing signal generated by causing a ground-fault detecting current transformer coupled to the neutral line to resonate, the synchronizing signal synchronizing the downloading of the data packet information signals from the host device.

9. The maintenance software computer program product of claim 6, wherein the current interrupting device is at least one of an arc-fault circuit interrupter (AFI), a combination arc-fault circuit interrupter (CAFI) device, a dual function/combination arc-fault circuit interrupter (DF/CAFI) device, or a ground-fault circuit interrupter (GFCI).

10. A current interrupting device, comprising:
   a current sensor coupled to a sensor input terminal of a current interrupting device, configured to sense data packet information signals downloaded over an electric power line for which the current interrupting device serves as a current interrupter of the electric power line, when the current interrupting device is operating in a maintenance mode, the data packet information signals being carrier signals modulated by data representing component units of an updated arc-fault detection protection software downloaded over the electric power line;
   a bandpass filter and demodulator, configured to receive the carrier signals and output filtered and demodulated data representing the component units of the updated arc-fault detection protection software, when the current interrupting device is operating in a maintenance mode;
   a sampler and digitizer, configured to sample and digitize the filtered and demodulated data to reproduce the component units of the updated arc-fault detection protection software from the received data packet information signals, when the current interrupting device is operating in a maintenance mode; and
   a processor configured to validate the reproduced component units of the updated arc-fault detection protection software downloaded over the electric power line and load the validated, reproduced component units of the updated arc-fault detection protection software, into a memory in the current interrupting device, when the current interrupting device is operating in a maintenance mode.

11. The current interrupting device of claim 10, further comprising:
   at least one memory and maintenance software computer program code configured to, with the processor, cause the current interrupting device at least to:
   synchronize with a host device, downloading over the electric power line from the host device, the data packet information signals representing the component units of the updated arc-fault detection protection software; and
   cause the current interrupting device operating in the maintenance mode, to signal over a neutral line of the electric power line to the host device, with a synchronizing signal generated by causing a ground-fault detecting current transformer coupled to the neutral line to resonate, the synchronizing signal synchronizing the downloading of the data packet information signals from the host device.

12. The current interrupting device of claim 10, further comprising:
   the current interrupting device operating in a protection mode, configured to interrupt current in the electric power line in response to an arc-fault identified by the updated arc-fault detection protection software executed by the processor.

13. The current interrupting device of claim 10, wherein the current interrupting device is at least one of an arc-fault circuit interrupter (AFI), a combination arc-fault circuit interrupter (CAFI) device, a dual function/combination arc-fault circuit interrupter (DF/CAFI) device, or a ground-fault circuit interrupter (GFCI).

\* \* \* \* \*